No. 611,893. Patented Oct. 4, 1898.
A. R. CLIZBE.
GRINDING MACHINE.
(Application filed Feb. 28, 1898.)
(No Model.) 2 Sheets—Sheet 1.
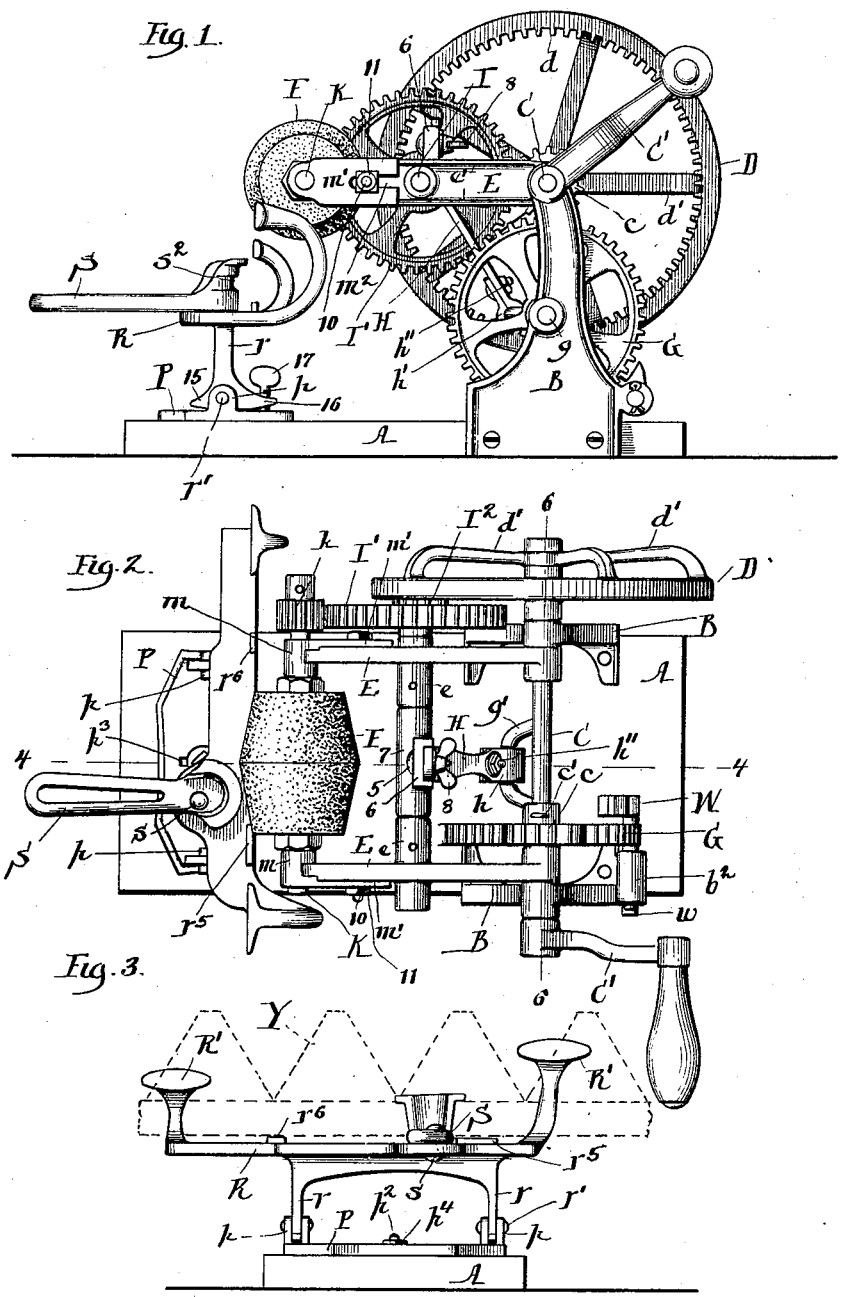

No. 611,893. Patented Oct. 4, 1898.
A. R. CLIZBE.
GRINDING MACHINE.
(Application filed Feb. 28, 1898.)
(No Model.) 2 Sheets—Sheet 2.
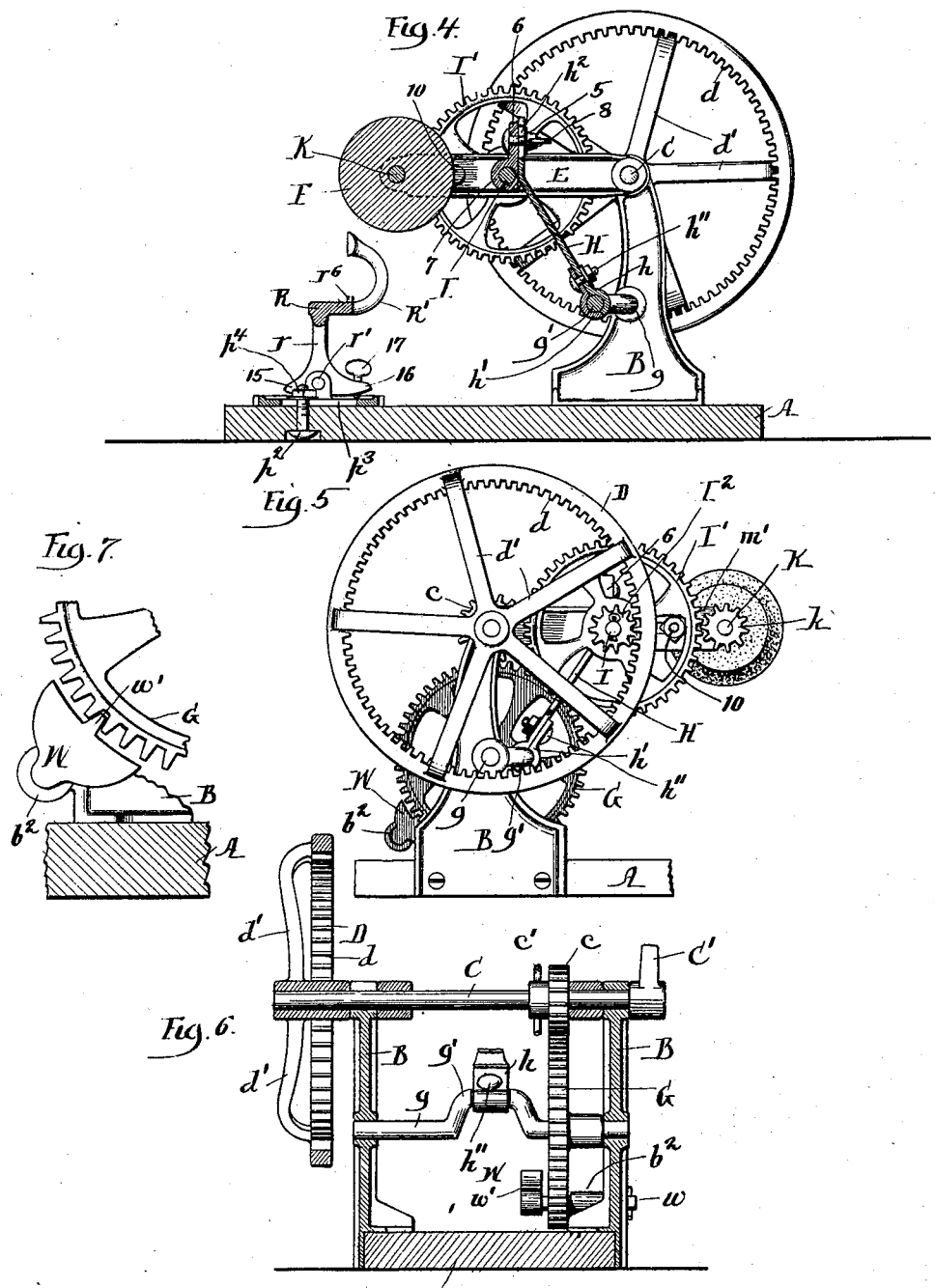

UNITED STATES PATENT OFFICE.

ADELBERT R. CLIZBE, OF CHICAGO, ILLINOIS.

GRINDING-MACHINE.

SPECIFICATION forming part of Letters Patent No. 611,893, dated October 4, 1898.

Application filed February 28, 1898. Serial No. 672,037. (No model.)

*To all whom it may concern:*

Be it known that I, ADELBERT R. CLIZBE, a resident of the city of Chicago, in the county of Cook and State of Illinois, have invented certain new and useful Improvements in Grinding-Machines, of which I do declare the following to be a full, clear, and exact description, reference being had to the accompanying drawings, forming a part of this specification.

This invention, while applicable for many other uses, relates more particularly to that class of grinding-machines designed for the sharpening of harvester-knives or the like in which the grinding-wheel is carried upon an oscillating frame adapted to be automatically moved in the direction of the length of the teeth as the grinding-wheel is revolved.

The invention consists in the various features of improvement hereinafter described, illustrated in the accompanying drawings, and particularly defined in the claims at the end of this specification.

Figure 1 is a view in side elevation of the machine embodying my invention. Fig. 2 is a plan view. Fig. 3 is a detail view in front elevation of the knife-holder. Fig. 4 is a view in vertical cross-section on line 4 4 of Fig. 2. Fig. 5 is a view in elevation from the side opposite to that shown in Fig. 1, the knife-holder being omitted. Fig. 6 is a view in cross-section on line 6 6 of Fig. 2, parts being shown in elevation. Fig. 7 is an enlarged detail view showing the means for locking the mechanism whereby the swinging frame is operated.

A designates the base of the frame, from which rise the standards B, that are united thereto. The upper ends of the standards B are formed with bearings for the main drive-shaft C, to one end of which is keyed the main drive-wheel D, while the opposite end of the shaft C has fixed thereto an operating-crank C', whereby the operation of the machine is effected. Upon the main drive-shaft C and preferably within the standards B are pivotally sustained the side bars E of the swinging frame that carries at its front end the grinding-wheel F. Upon the main drive-shaft C is placed the pinion $c$, this pinion being preferably formed with a hub at one side thereof, a hole being formed in this hub to receive a cotter-pin $c'$, whereby the pinion is keyed to the shaft C. By removing the cotter-pin $c'$ the pinion $c$ can be shifted longitudinally on the shaft C for a purpose to be presently stated.

When in its normal position upon the shaft C, (see Fig. 6,) the pinion $c$ meshes with the teeth of a gear-wheel G, that is keyed upon a crank-shaft $g$, journaled in suitable bearings in the standards B. The cranked portion $g'$ of the shaft $g$ passes through a coupling $h$ at the lower end of the bar H, this coupling consisting, preferably, of a plate $h'$, having a semicylindrical seat therein at one end, while its opposite end is bolted, as at $h^2$, to the lower end of the bar H, as clearly shown in Figs. 2, 4, and 6 of the drawings. The upper end of the bar H is formed with a slot $h^3$, through which passes a screw-bolt 5, that extends through the arm 6 of a bearing-sleeve 7, loosely mounted upon a shaft I, that extends between and is carried by the side bars E of the swinging frame. The threaded end of the screw-bolt 5 is provided with a thumb-nut 8, whereby the upper end of the bar H can be securely clamped to the arm or bracket 6 of the sleeve 7, a washer being preferably interposed between the thumb-nut and the upper end of the bar H. By means of the bar H the swinging frame is adjustably connected to the crank $g'$ of the shaft $g$, and by changing the adjustment of the bar the throw or extent of vibration of the swinging frame E, and consequently of the grinding-wheel F, can be readily and accurately varied.

I prefer to locate the adjusting-nut 8 at the upper end of the bar H, because in such position it can be conveniently grasped when changes in the throw of the swinging frame are desired.

The shaft I preferably passes through sleeves $e$, (see Fig. 2,) cast integral with the side bars E of the swinging frame, and by preference also the shaft is rigidly secured to the side bars by pins or otherwise, in order to give greater rigidity to the frame. Upon the outer end of the shaft I is mounted a gear-wheel I' and a pinion I², this gear-wheel and pinion being preferably formed as a single casting. The pinion I² extends within the main drive-wheel D, the interior of which is formed with teeth $d$, that mesh with the teeth of the pinion, and the rim of the main drive-wheel D is supported by the curved arms $d'$, that extend from the hub of the wheel, as clearly shown in Figs. 5 and 6 of the drawings.

The gear-wheel $I'$ meshes with a pinion $k$, that is keyed to the end of the grinding-wheel shaft K, this grinding-wheel shaft being carried by bearings $m$ of the arms $m'$, that are adjustably connected to the side bars E of the swinging frame. Preferably the outer faces of the side bars E of the swinging frame are formed with ribs $e'$, and the inner faces of the bearing-arms $m'$ are shaped to engage these ribs, and each of the bearing-arms $m'$ is formed with a long slot $m^2$, through which passes a bolt 10, that passes also through a hole in the corresponding side bar E of the swinging frame, the bolt being furnished with a nut 11, whereby the bearing-arms $m'$ can be securely connected to the side bars. By means of the slots $m^2$ the bearing-arms can be readily adjusted lengthwise of the side bars E, in order to adjust the grinding-wheel F, and this feature is advantageous not only because it permits the grinding-wheel to be readily adjusted and removed, but also because in this way any wear between the gear-wheel $I'$ and the pinion $k$ can be readily taken up.

In machines of this character it is highly desirable that the grinding-wheel shall have imparted thereto a very high speed of revolution, and by providing the gear-wheel $I'$ and pinion $I^2$ between the main drive-wheel D and the pinion $k$ on the grinding-wheel shaft it will be seen that a comparatively slow movement of the driving-wheel will impart high speed to the grinding-wheel F. Inasmuch as the teeth $d$ of the grinding-wheel F are formed in correspondence with the arc described by the pinion $I^2$ as it is carried by the swinging frame, it will be seen that the pinion $I^2$ and drive-wheel D remain constantly in gear notwithstanding the movement of the swinging frame.

From the foregoing description the operation of the parts thus far defined will be seen to be as follows: The operator, by means of the crank $C'$, will impart revolution to the drive-wheel D, and by means of the pinion $I^2$, gear-wheel $I'$, and pinion $k$ a high speed of revolution will be transmitted to the grinding-wheel F. At the same time the pinion $c$ on the drive-shaft C will impart a slow revolution to the crank-shaft $g$ through the medium of the gear-wheel G, and inasmuch as the crank $g'$ of the shaft $g$ is connected to the swinging frame it is manifest that a corresponding oscillating or swinging movement will be imparted to this frame and to the grinding-wheel F, carried thereby. As the grinding-wheel is thus swung upward and downward it will pass up and down the edges of the harvester-knife that will be held in proper position by the suitable knife-holder, preferably of the construction hereinafter described. Inasmuch as the swinging frame is adjustably connected with a crank-shaft $g$, it will be seen that the throw of the swinging frame can be accurately determined, thus preventing the grinding-wheel from descending so far as to cut the reinforce-bar, which in some classes of harvester-knives is employed throughout the length of the knives and in other types of harvester-knives extends only along the end portions. It will be observed also that by means of the thumb-nut 8 at the upper end of the connecting-bar H any desired change in the swing of the grinding-wheel can be quickly and accurately made.

For some classes of work it is highly desirable to retain the grinding-wheel F in stationary position while it is revolved—as, for example, in cutting a nick or dent in some particular part of the knife being ground. In order to enable the grinding-wheel to be thus held, I prefer to mount the pinion $c$ so that it can be moved longitudinally along the shaft C into and out of gear with the gear-wheel G, and it is manifest that when the pinion $c'$ is moved from engagement with the gear-wheel G motion will not be transmitted to the swinging frame. In order to more rigidly retain the swinging frame in stationary position, I prefer to employ a lock for engaging the gear-wheel G, this lock consisting, preferably, of a dog or brake W, that is formed at the outer end of a shaft or stud $w$, that is mounted in manner free to slide within a bearing $b^2$, formed at the base of one of the standards B. (See Figs. 1, 2, and 7.) The dog or brake W has a tooth $w'$, adapted to slide between and engage the teeth of the gear-wheel G when the dog is shifted from its normal or idle position (see Fig. 2) to the locking position, as shown in Fig. 7—that is to say, the dog or brake W is normally disengaged from the gear-wheel G—but when the swinging frame E is lifted to any desired position and the dog W is caused to engage with the gear-wheel G it will securely retain the swinging frame in such position. As the pinion $c$ will at such time be disengaged from the gear-wheel G, it is obvious that by turning the drive-wheel D the grinding-wheel F will be revolved without vibration being transmitted to the swinging frame.

The holder whereby the harvester-knife will be retained during the grinding operation will next be described. This knife-holder is shown as mounted upon a plate P, that is adjustably connected to the front of the base-board A. From the ends of the plate P rise the lugs $p$, preferably cast in piece with the base-plate. Between the lugs $p$ at each end of the base-plate and pivotally connected thereto are the dependent arms $r$ of the knife-holder R, these arms being preferably cast in piece with the body of the knife-holder. The arms $r$ of the knife-holder, being united by the pivot-pins $r'$ to the lugs $p$, permit the knife-holder to be rocked in forward or backward direction, while the forward and rearward extensions 15 and 16 at the lower ends of the arms $r$ limit the rocking movement of the knife-holder R. One of the extensions 16 is provided with a threaded hole, through which passes a set-screw 17, whereby the extent of forward movement of the knife-holder may be accurately determined. This is a feature of manifest advantage, because by accurately limiting the forward movement of the knife-holder any excessive grinding of the knife is securely guarded against.

The upper face of the knife-holder R constitutes the support for the back edge of the harvester-knife Y, and the rear edge of the knife-holder R is provided with the upwardly-extending lugs $r^5$ and $r^6$, which will coöperate with the eccentric clamp-handle S in securely retaining the knife Y upon the knife-holder.

By reference to Figs. 2 and 3 of the drawings it will seen that the clamp-handle S, which is pivotally connected by a pin $s$ to the knife-holder, is located at one side of the center of the knife-holder and of the grinding-wheel F and is located opposite the lug $r^5$ of the knife-holder. The purpose of thus locating the clamp-handle at one side of the center of the grinding-wheel is to insure a firm engagement of the knife by the clamp-handle S and the lugs $r^5$ without danger of cramping or bending the knife, which would be apt to occur if the clamp-handle were located centrally of the knife-holder and between the lugs $r^5$ and $r^6$, and, moreover, this location of the clamp-handle and lugs $r^5$ enables the free end of the knife to be securely held for the grinding operation. It will be observed that the bearing or eccentric face of the clamp-handle S is adapted to bear upon the upper and lower part of the knife Y; but the central portion of the bearing-face of the clamp-handle is cut away, as at $s^2$, so as to allow a free space for the passage of rivet heads or bolts that project from the blade of the harvester-knife.

At the rear edges and at the ends of the knife-holder project the rearwardly-extending curved bearing arms or horns R′, the upper ends of which are laterally expanded to afford broad bearings for the face of the knife. The purpose in curving rearwardly the arms R′ is to afford an open space for the passage of the bars that are frequently joined to harvester-knives, and by reference to Figs. 2 and 3 it will be seen that the horn or arm $r'$ at the right-hand end of the knife-holder is considerably larger or of greater curvature than the horn at the opposite end, the purpose of this being to enable the eye-holding bar at the end of the harvester-knife to pass therethrough, so as to permit the end teeth of the knife to be ground.

From the foregoing description it will be seen that when the harvester-knife Y (see dotted lines, Fig. 3) is set in position upon the knife-holder and the clamp-handle S is turned to the locking position the eccentric face of the clamp-handle will bear not only against the lower portion of the harvester-knife, but also against its upper portion, and thus securely retain the knife in position to be ground. Preferably the base-plate P of the knife-holder is adjustably connected to the base A of the machine by means of a bolt $p^2$, that passes through a slot $p^3$ in the base-plate P and into or through the base A. By loosening the nut $p^4$ of the bolt $p^2$ the plate P may be turned to any desired position or may be adjusted in backward or forward direction, and when the nut is tightened the plate P will be securely retained in the required position. When the harvester-knife is upon the knife-holder in position to be ground, the operator, grasping the clamp-handle S, can rock the knife-holder so as to cause the knife to bear properly upon the grinding-wheel. As the swinging frame moves up and down, carrying the rapidly-revolving grinding-wheel F with it, the operator will rock the knife-holder and the harvester-knife in order to accurately present the edge of the knife to the surface of the grinding-wheel.

Having thus described my invention, what I claim as new, and desire to secure by Letters Patent, is—

1. In a grinding-machine, the combination with suitable supports or standards, of a drive-shaft, a swinging frame carrying a grinding-wheel, means for revolving said grinding-wheel, a crank-shaft extending between said standards and in gear with said drive-shaft and a suitable bar pivotally connected at one end to the swinging frame and at its opposite end connected to said crank-shaft, substantially as described.

2. In a grinding-machine, the combination with suitable supports or standards, of a drive-shaft, a swinging frame carrying a grinding-wheel, means for revolving said grinding-wheel, a crank-shaft in gear with said drive-shaft and an adjustable connector between said swinging frame and said crank-shaft whereby the extent of movement of the swinging frame can be determined, substantially as described.

3. In a grinding-machine, the combination with suitable supports or standards, of a drive-shaft, a swinging frame carrying a grinding-wheel, means for revolving said grinding-wheel, a crank-shaft in gear with said drive-shaft and a connecting-bar between said swinging frame and said crank-shaft having adjustably connected to its rear end a yoke or coupling that engages with the crank of the crank-shaft, substantially as described.

4. In a grinding-machine, the combination with suitable supports or standards, of a drive-shaft, a swinging frame carrying a grinding-wheel, a crank-shaft in gear with said drive-shaft, a shaft extending between the side arms of the swinging frame, a sleeve mounted upon said shaft and provided with an upright arm and a bar or connector having its lower end pivotally joined to the crank-shaft and having its upper end adjustably connected to the upright arm of said pivoted sleeve, substantially as described.

5. In a grinding-machine, the combination with suitable supports or standards, of a swinging frame carrying a grinding-wheel, a drive-shaft in gear with the shaft of the grinding-wheel, a shaft for oscillating said swinging frame, a gear-wheel mounted upon said last-mentioned shaft, a shiftable pinion longitudinally movable upon the drive-shaft, and a movable lock or dog for engaging said gear-wheel in order to hold the swinging frame in fixed position, substantially as described.

6. In a grinding-machine, the combination with a main drive-shaft, of a swinging frame having its rear end mounted upon said drive-shaft, a grinding-wheel shaft journaled in the front end of said swinging frame and provided with a pinion, a gear-wheel journaled at one side of said swinging frame and meshing with the pinion on the grinding-wheel shaft, and a pinion connected with said gear-wheel and meshing with the teeth of the main drive-wheel, said main drive-wheel being of such size that said pinion will remain in engagement therewith as the swinging frame is oscillated, substantially as described.

7. In a grinding-machine, the combination of a main drive-shaft, a gear-wheel having its rim provided upon its interior with teeth, a swinging frame carrying a pinion that meshes with the teeth of the main drive-wheel, a grinding-wheel shaft carried by the swinging frame and provided with a pinion and a gear-wheel meshing with the pinion of the drive-wheel shaft and connected with the pinion that meshes with the main drive-wheel, substantially as described.

8. In a grinding-machine, a knife-holder comprising a pivoted body R provided with a clamp-handle S, the face of which is furnished with upper and lower bearing-surfaces and an intermediate space, the body of the knife-holder being provided with suitable lugs at its rear edge, substantially as described.

9. In a grinding-machine, a knife-holder having its rear edge provided with curved arms or horns R', the arm or horn at the right-hand end of the knife-holder being enlarged to permit the passage of the eye-holding bar of the harvester-knife, substantially as described.

ADELBERT R. CLIZBE.

Witnesses:
OLIVER C. DENNIS,
ALBERTA ADAMICK.